Nov. 25, 1952 — T. ENGELHART — 2,618,860
LAYOUT MACHINE FOR AIRPLANE CONSTRUCTION
Filed Oct. 21, 1949 — 6 Sheets-Sheet 4

Inventor
TRUE ENGELHART
ATTORNEY

Nov. 25, 1952     T. ENGELHART     2,618,860
LAYOUT MACHINE FOR AIRPLANE CONSTRUCTION Filed Oct. 21, 1949     6 Sheets-Sheet 6

Inventor
TRUE ENGELHART

ATTORNEY

Patented Nov. 25, 1952

2,618,860

UNITED STATES PATENT OFFICE 2,618,860

LAYOUT MACHINE FOR AIRPLANE CONSTRUCTION

True Engelhart, Pattonville, Mo.

Application October 21, 1949, Serial No. 122,808

5 Claims. (Cl. 33—189)

This invention relates to improvements in equipment for laying out master templates, full scale layout drawings and analogous work, frequently referred to as lofting. Such equipment is particularly, although not exclusively, adapted to use in the aircraft industry, and I will accordingly disclose and discuss its application to this particular field herein.

In the modern production of airplanes, a great number of full scale drawings and templates are used and these are made upon large lacquered metal sheets, on which the configuration of the part, or a section through the fuselage, wing or the like, is laid out by the use of reference lines at right angles on the sheet and the location of points along the desired configuration located along coordinates referable to said lines. The drawings or templates are made full scale, although they are in most cases very large, in order to increase the accuracy with which they may be laid out, or at least to facilitate the work. As an example, a bulkhead template for the fuselage may be laid out from a chart giving coordinate dimensions with reference to a mid-breadth line and an intersecting water line. These lines may be carefully laid out on the sheet and then by reference to the chart points along the outside shape or contour, are laid out in succession by picking up the dimensions from a scale with dividers or trammels and transferring them to the sheet, referenced to the mid-breadth and water lines, and making a prick-mark at each point so located. These prick-marks are then subsequently joined and the shape cut out from the sheet; or small holes are drilled through the sheet at each mark for transferring the layout to other sheets. It will be readily appreciated that this is a time consuming task to an extreme, and when the great number of templates and full scale lay-outs necessary for each type of aircraft is considered, the aggregate man-hours involved in this work is almost staggering to behold. Then too, due to the human error that may be involved, and despite the use of magnifying glasses in the work, accuracy exceeding five thousandths of an inch is impossible to attain. This work is a tremendous problem to the industry and the magnitude of the problem is increasing as the speed of aircraft moves into the supersonic ranges, where accuracy and precision of shaping and streamlining are vital to success.

As one attempt not only to speed up the work of laying out the templates, but also to achieve better accuracy, it has been proposed to first lay out on the sheet a grid of intersecting reference lines before actually getting into the layout of the shapes and configurations, as exemplified in Patent No. 2,423,564. Most manufacturers, however, feel that the older methods, while requiring longer dimensions to be picked up and transferred to the sheet, are preferable in that the possible confusion due to the large number of grid lines on the sheet is thus avoided. In all cases to my knowledge, however, and regardless of the way in which the reference lines are determined, the actual measurements and the lay-out work ittself are done by hand, with the end result that much time is consumed and accuracy of the kind really required is impossible.

Bearing in mind the foregoing, it is the primary object of my invention to provide a machine by means of which the lay-out points may be determined and marked mechanically, with a speed and precision impossible even to approach by hand work, and thus to solve the problems facing the industry in the laying out of the many templates and drawings necessary for each new development. As to accuracy, my machine will operate to lay out the work to one-thousandth of an inch, as compared to the best claimed accuracy of present methods of one-hundredth using the grid machine above referred to, and of five-thousandths, which is about the optimum possible in picking up dimensions by hand and eye from a scale.

Another object of my invention is to provide a machine of this character, including traversable carriages operating in paths at right angles in precision guideways, and each carrying an illuminated optical enlarger or lens for reading positions of the carriages with reference to scales located along the paths travelled by the carriages. According to my invention each carriage has rapid traverse means, a clamp or lock device by which the carriage may be fixed in position, and finally means by which fine adjustment may be made to precise positions with reference to the scales. All of such means are controlled from a centralized group of controls so that the operator may readily and rapidly locate the carriages as required. One carriage then includes a punch, also operated from the central control point, and it will be readily understood that any point, the coordinates of which are within the scope of the machine, may be located by traversing, locking and finely adjusting the carriages, and operating the punch.

Another and important object of my invention is to provide in the machine, for the accurate location of the layout points, and for the individual adjustment of the respective carriages, a cooperating tape, scale and vernier for each carriage. The scales bear .025" graduations with a longer mark at each tenth inch, while the tapes are graduated in inches and tenths with numerals designating the inches and tenths in both directions from zero. Both scales and tapes are adjustable for initial indexing, following which the verniers cooperate with the scales, permitting readings to one-thousandth of an inch, as stated hereinbefore. Accurate indexing and reading is, of course, facilitated by the optical enlargement provided by the reading stations upon the carriages.

Another object is to provide an improved marker for the located points, embodying, in addition to a prick punch for indenting the sheet accurately at the various points, a means for imprinting a small circle with an erasable marking fluid around each indent to facilitate its location on the sheet. This is important since the sheet is of large expanse and the great number of prick points are sometimes difficult to locate thereon.

Still a further object of the invention is to provide a machine of this character which, in addition to its function of accurately locating and prick punching layout points, may also be used to accurately scribe reference lines upon the sheet whenever required.

Another object is to provide a machine for these purposes which is a self-contained unit permitting it to be readily installed on a layout table, or on the lofting floor according to the work to be done.

It is sometimes necessary, after the layout work on a sheet has been completed on the layout table and the sheet removed, to return the sheet to the table for additional work, or correction. According to my invention, and as another object thereof, I provide means by which the sheet may in such case be accurately re-oriented upon the table for such further work as may be required.

With the foregoing and other objects in view, as will appear in the course of the following specification, the invention resides in the novel construction and arrangement of parts as will now be described in detail, reference being had to the accompanying drawings wherein.

Referring now more particularly and by reference characters to the drawing, A designates a layout table of a size and construction such as to support a layout sheet B perfectly flat, the sheet being held in place around its edges by a number of conventional clamps C. The table A and sheet B are so proportioned as to size that a space is left along one side of the sheet for the main support of the layout machine, designated generally at D in Figure 1. However, it is possible to support the machine to one side of the table by the use of suitable suspension brackets (not shown) so that the entire top of the table is free to receive the sheet, as will be readily understood.

Figures 1, 11:
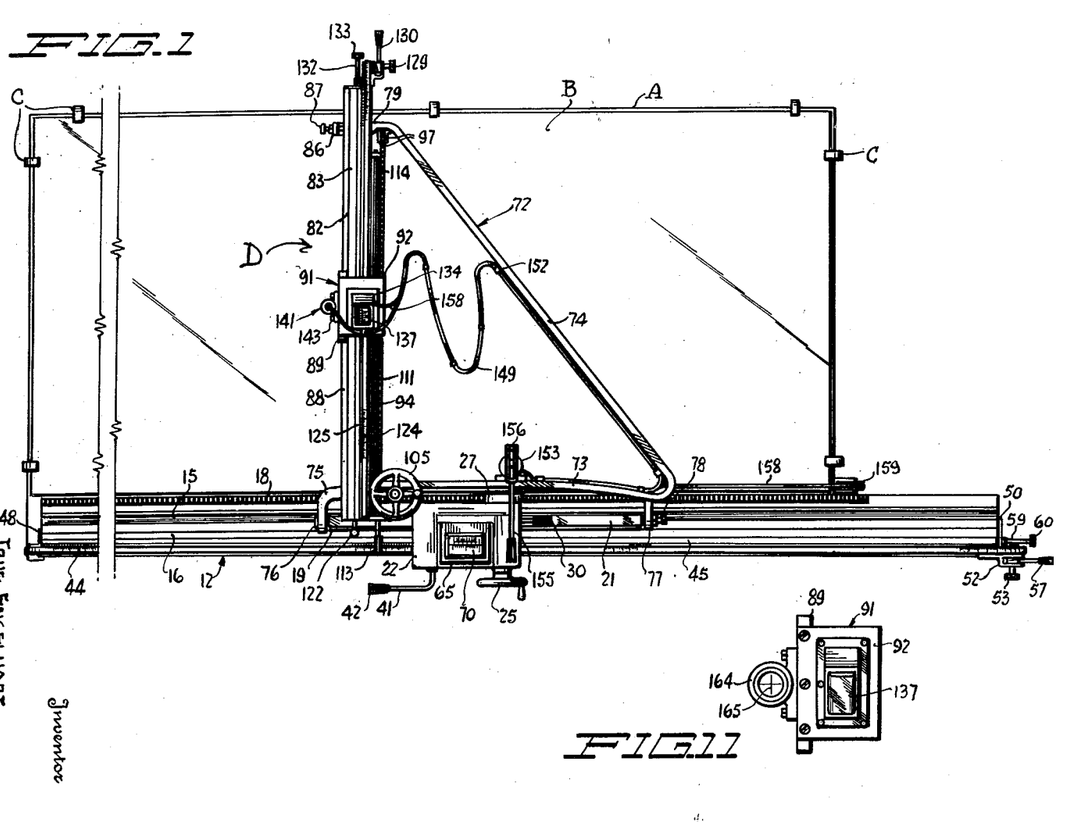
Figure 1 is a plan view of a layout machine according to my invention, arranged upon a table, and with a portion of the table and the main support for the machine omitted.
Figure 11 is a plan view of the cross slide carriage, showing the punch replaced with a magnifying glass and cross hair reticule constituting the re-orienting attachment.
Figures 3, 4:
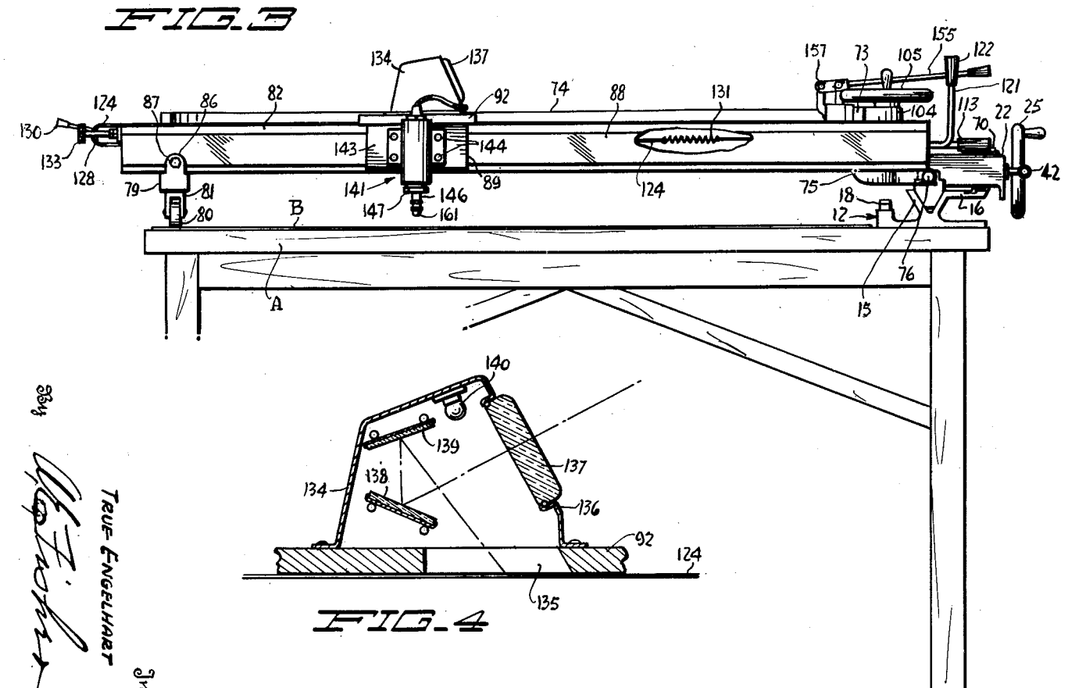
Figure 3 is a vertical cross section along the line 3—3 in Figure 2.
Figure 4 is an enlarged vertical sectional view through the illuminated optically enlarging reading station or lens upon the cross slide carriage of Figure 3.
Figure 5:
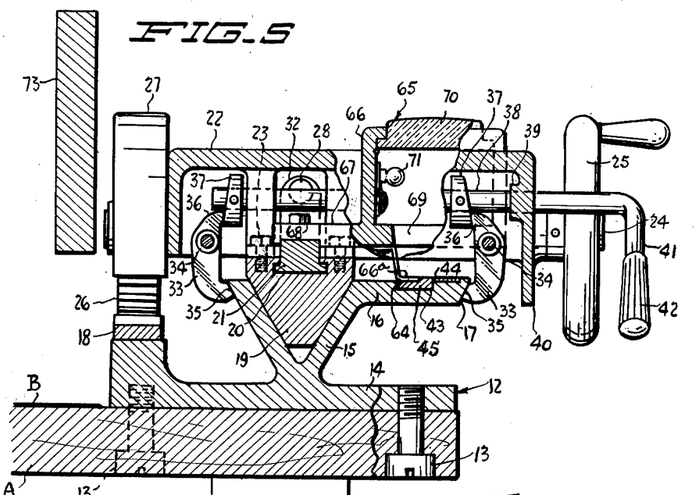
Figure 5 is an enlarged vertical cross sectional view along the line 5—5 in Figure 2 and showing particularly the clamp or lock means for the main carriage, and associated elements of the machine.
Figure 6:
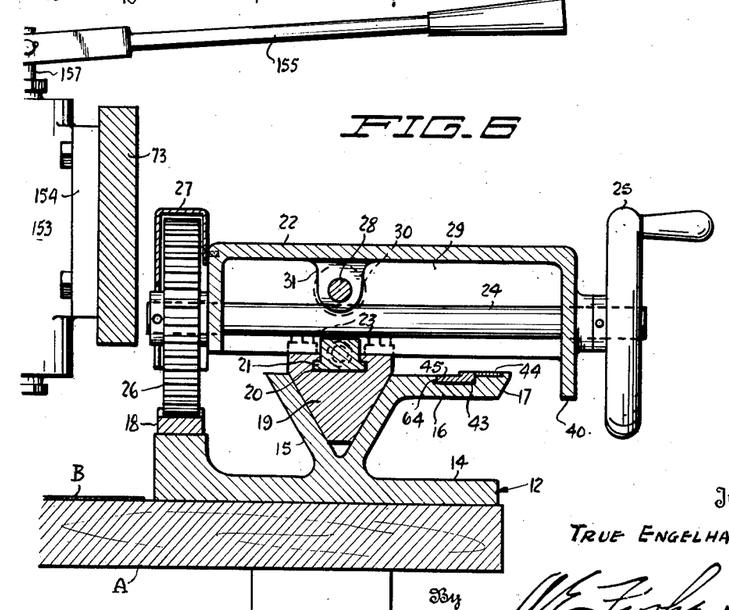
Figure 6 is a similar cross sectional view taken substantially along the line 6—6 in Figure 2, showing the traversing means for the main carriage.

Turning now to a description of the layout machine in detail, it comprises an elongated main support 12, longer than the table A, to extend beyond one of its ends as seen in Figure 1, and secured firmly to the table by a number of cap screws 13 or other suitable fastening means. The support, as best shown in Figures 3, 5 and 6, comprises a base plate 14 along which extends an accurately machined, upwardly opening V-way or guide 15 having a flange 16 along its outer edge extending horizontally and surfaced off on its outer edge 17 at the same angle as the adjacent side of said V-way. A gear rack 18 is secured to and extended along the inner edge of the base 14, parallel with the V-way, for a purpose presently to appear. A V-block or carrier 19, machined to closely fit the V-way 15, is slidably mounted therein for travel lengthwise alongside the layout sheet B. The top of the block 19 is surfaced off horizontally and a dovetail guideway 20 is formed in this upper edge from end to end of the block to receive a complementary dovetail slide 21. A main carriage assembly 22 is secured by lugs and cap screws 23 to the top of the V-block 19 to travel therewith, and adjacent one end of the carriage a traversing shaft 24 (Figure 6 particularly) is journaled at right angles to the V-block and main support. A hand wheel 25 is secured to the outer end of the shaft 24 and at its inner end a traversing spur gear 26 is secured to mesh with the rack 18, the gear being partially covered by a guard 27 secured on the carriage. It will be evident that the V-block, slide and carriage may all be traversed in either direction in the V-way 15 by turning the hand wheel 25.

This traversing action is rapid in operation, and for fine and accurate final adjustment I provide a hand screw 28 extending lengthwise above the slide 21 through one end 29 of the carriage 22. At its exposed end, the screw 28 is provided with a handle 30 and within the carriage it is supported against endwise displacement in a lug 31 (Figure 6) and is screwed through an upstanding tapped lug 32 on the slide (Figure 5). Thus turning the screw will adjust the slide endwise with respect to the carriage and V-block 19. The carriage is clamped (to the main support or V-way) in any position to which it is traversed by the hand wheel 25, by means of clamp dogs 33 fulcrumed on pins 34 forming part of the carriage 22, to swing at their lower ends toward and away from the inside flange surface of the V-way 15 and the surfaced-off edge 17 of the flange 16. The dogs 33 are beveled at lower ends 35 to closely meet and fit these surfaces of the main support, and above the pins 34 the dogs have cam ends 36 to cooperate with cams 37 secured on a shaft 38 extending out through a bearing 39 in the outer side 40 of the carriage. See Figure 5. At its outer end the shaft 38 is turned to form a crank end 41 and carries a handle 42. By swinging the handle 42 in the proper direction the cams 37 will spread the upper ends of the clamp dogs 33, causing them to tightly grip the V-way and thus lock the carriage and V-block thereto, as will be readily understood.

Figure 7:
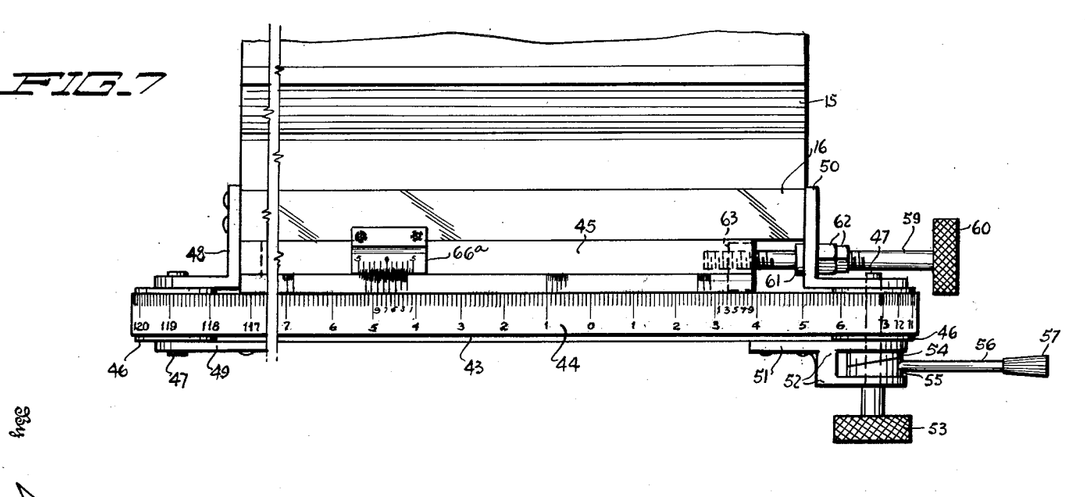
Figure 7 is an enlarged fragmentary plan view of a base portion of my machine, showing the vernier, scale and tape, and the adjustments for the latter two.
Figure 8:
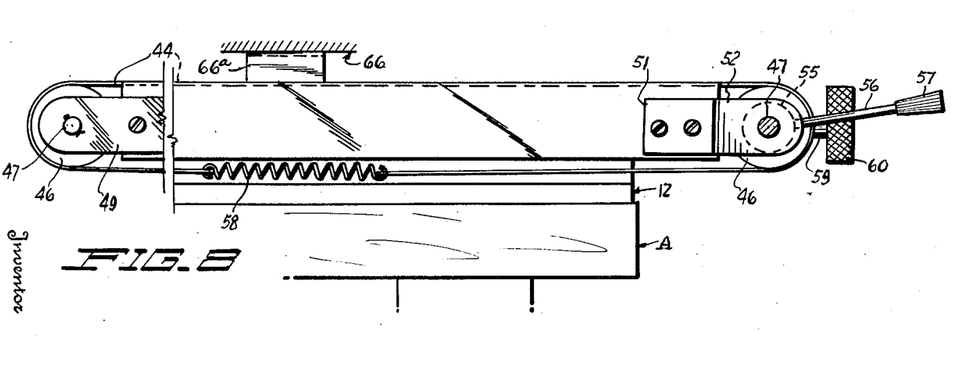
Figure 8 is a side elevation of the elements shown in Figure 7.

It is necessary for my purpose to indicate the location of the foregoing assembly along the support 12 with extreme accuracy, and for this purpose I provide the elements next to the described. Formed lengthwise along the upper surface of the flange 16 of the V-way guide is an irregularly shaped groove or channel 43 and this accommodates, in edge to edge relation, an endless flexible tape 44, and a heavier, elongated scale 45. The tape 44 is graduated in inches and tenths, with the inches denoted by longer graduation marks and numbers in both directions from a zero point, while the scale 45 carries no numerals but is graduated in tenths (of inches) with intervening shorter graduation marks at intervals of twenty-five thousandths. As shown in Figure 7, these graduations are formed along the edge of the scale opposite the tape. The tape 44 is trained, at opposite ends of the main support 12, around rollers 46 carried upon roller shafts 47. At one end of the table the shaft 47 is journaled in an L-shaped bracket 48 and a bracket arm 49 secured to the outwardly directed flange 16 of the V-way 15, while at the opposite end the corresponding end of the roller shaft 47 is journaled in an L-shaped bracket 50 and a cam mounting bracket 51 similarly secured in place. The shaft 47 at this end extends through a bifurcated portion 52 of the bracket 51 and is provided with a knurled knob 53 by which the tape may be adjusted in either direction. After adjustment, the tape is locked by cooperating, angularly faced cams 54—55 placed on the shaft 47 between the bifurcations of the bracket 51, and one of which is provided with a radially extending locking arm 56 with a knob 57. It is obvious that movement of the arm 56 in one direction will cause the cams 54—55 to pull the adjacent roller 46 tight against the inner face of the bracket 51 to prevent its rotation and consequently lock the tape. The tape 44, while effectively endless as described, is parted beneath the flange 16 and the ends joined by a retractile coil spring 58 (Figure 8) to keep the tape in a taut condition at all times.

The scale 45 is adjustable, precisely and in an endwise direction, by a screw 59 located at the end of the table carrying the tape adjustments just described. This screw 59 has a knurled knob 60 at what may be termed its outer end, and is slidably mounted through the adjacent bracket 50 toward the adjacent end of the scale. A collar 61 is fixed on the screw inwardly of the bracket 50, and outwardly thereof lock nuts 62 are threaded on the screw so that it is held positively against axial displacement through the bracket. The inner extremity of the screw, opposite the knob 60, is threaded in and through a lug 63 secured to and depending from the end of the scale. As seen in Figures 5 and 6, one edge of the scale is dovetailed or beveled to slidably fit a correspondingly angular edge 64 of the groove 43 in the flange 16. Thus the scale may be adjusted by the screw 59 endwise with respect to the tape 44, but is held against upward displacement.

Forming part of the carriage assembly is an illuminated, optically enlarging reading station, designated generally at 65, for reading the position of the slide 21 with reference to the tape 44 and cooperating scale 45. In the construction here shown the reading station is carried by the slide 21 with provision made for minor and comparatively minute adjustments with the slide after the carriage 22 is clamped in place, and the station comprises a housing 66 having a laterally projecting base flange 67 on its inner side, overlying and secured to the slide 21 by cap screws, one of which appears at 68 in Figure 5. The housing 66 is generally rectangular in shape, having a lower opening 69 centered over the tape 44 and scale 45, and an upper opening in which is fastened a lens 70 at proper focal distance above the tape and scale to form an optically enlarged and readily readable view or image thereof. One (or more) small electrically energized lamps 71 (Figure 5) is provided in the housing 66 to illuminate the tape and scale, and improve the visibility thereof through the lens 70.

The slide 21 supports one end of, and positions in one direction, a cross slide and support mechanism which will now be described. Such mechanism comprises a yoke, designated generally at 72, having an arm 73 positioned inwardly of and alongside the main support 12, and an angularly positioned arm 74 which extends out over the table to the edge thereof opposite the main support 12. At one end the arm 73 has a curved extension 75 from its lower edge which fits over the adjacent end of the slide 21 and is pivotally mounted thereto by a tapered bearing and pin assembly 76. At the opposite end of the arm 73, where it curves to meet the arm 74, a lug 77 projects across the other end of the slide 21 and carries a taper-ended lock-screw 78 by which it is pivoted to the slide. The pivot connections 76 and 78 are coaxial and permit up and down swinging movement of the yoke in a vertical plane, at right angles to the main support 12. The extremity of the arm 74 has a seat 79 at the same level as the upper surface of the extension 75 and which acts as a seat. A roller 80 is journaled in a bracket 81 beneath this seat to support this end of the yoke upon the table A or sheet B, and thus the yoke may travel over the sheet as the slide 21 and associated parts are traversed along the main support 12, as will be readily understood.

Figure 9:
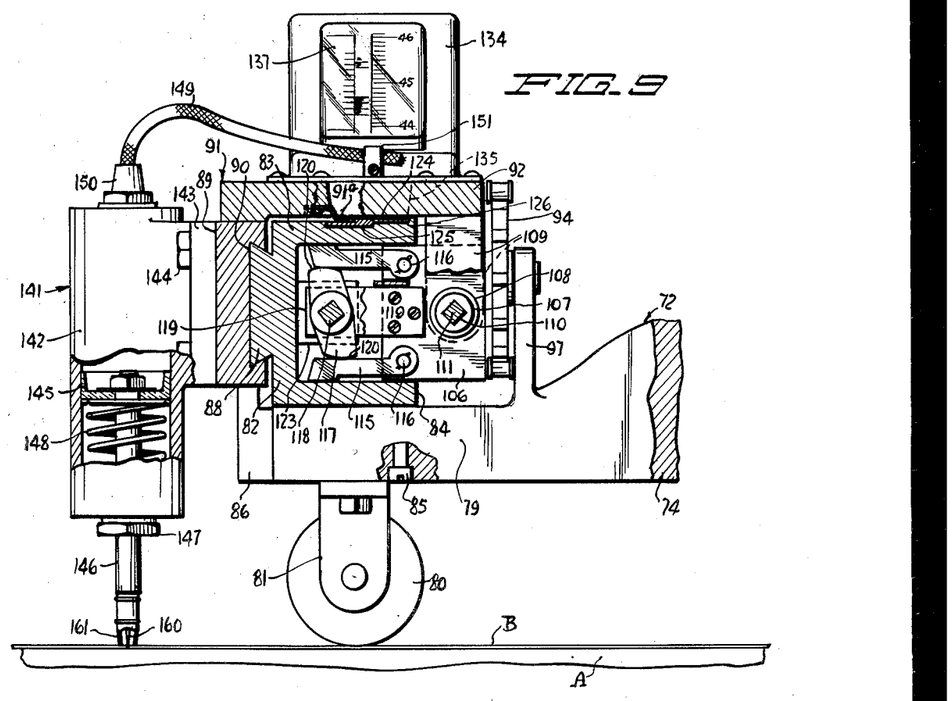
Figure 9 is an enlarged vertical sectional view taken substantially along the line 9—9 in Figure 2, showing the clamp and adjustment means for the cross slide carriage, and the prick punching and marking means.

Secured upon and across the seats 75 and 79 is a heavy guide channel element having a vertical web 82 and upper and lower horizontal flanges 83 and 84. The lower flange 84 is secured to the seats by cap screws 85 and the channel is set up at exactly right angles to the V-way of the main support 12. For this purpose a lug bracket 86 is secured to the end face of the seat 79 to project upwardly in spaced relation to the web 82 and is threaded to accommodate a set screw 87 which may be adjusted against the web to properly position the channel, prior to drawing up the screws 85. Formed along the vertical exterior face of the web 82 is a dovetail guide 88, and slidably mounted thereon, for travel in a horizontal plane over the layout sheet B, is a slide 89 with a complementary dovetail 90 (Figure 9).

Figure 10:
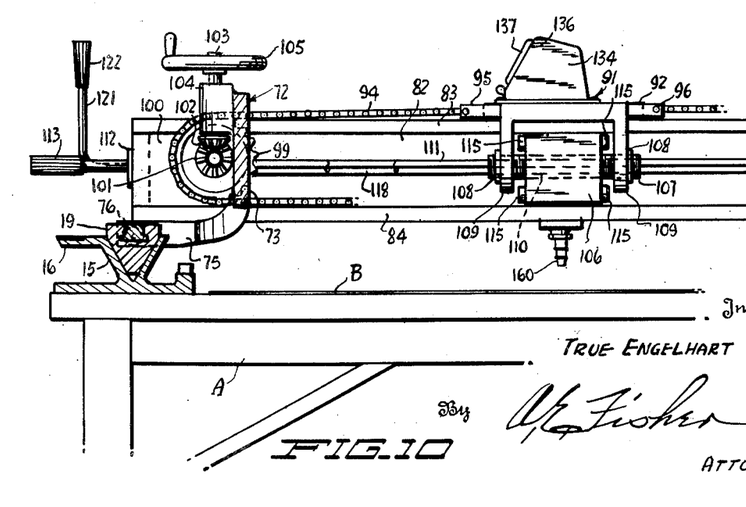
Figure 10 is a fragmentary cross sectional view along the line 10—10 in Figure 2.

The slide 89 carries a carriage assembly indicated at 91 and including a top plate 92 secured by cap screws 93 to the upper edge of the slide to travel along the upper face of the flange 83. For rapidly traversing this carriage 91, I provide a sprocket chain 94 which is secured at its ends as at 95 and 96 to opposite corners of the top plate 92 and which chain extends along the upper and lower channel flanges 83 and 84, as best seen in Figure 10. Adjacent the seat 79 the yoke arm 74 has bearing brackets 97 carrying an idler sprocket 98 for the traversing chain 94, and at the opposite end of the assembly the chain runs over a drive sprocket 99 carried on an L-shaped brackekt 100 secured to this end of the guide channel and then extending back along the upper and lower flanges 83 and 84 thereof. The drive sprocket 99 has a bevel gear 101 (Figure 10) on its shaft, which meshes with a similar gear 102 at the lower end of a shaft 103 carried in a vertical bearing 104 secured to the yoke arm 73. A hand wheel 105 is attached to the upper end of the shaft 103 and turning this wheel will obviously operate the chain 94 through the gears 101 and 102 and drive sprocket 99 to move the carriage 91 in either direction along the dovetail guide 88.

Figure 2:
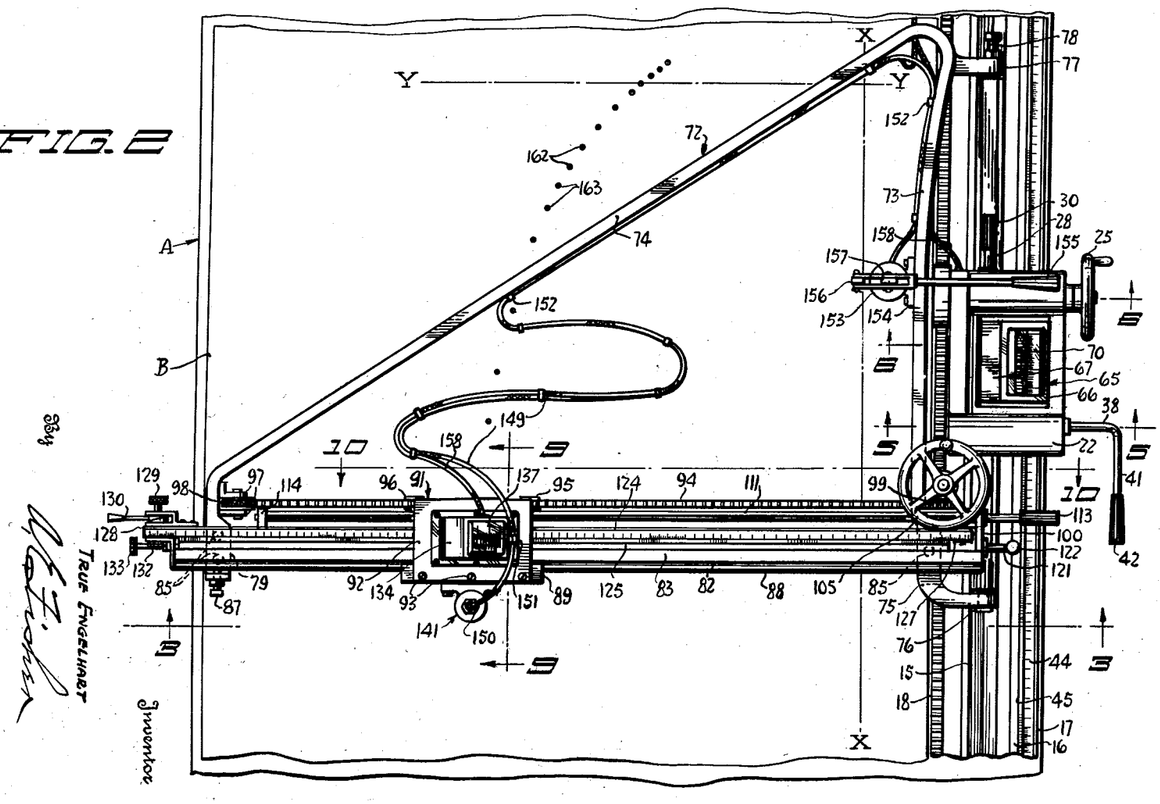
Figure 2 is an enlarged plan view of the main operating element of the machine, and showing a number of layout points prick-marked and circled with the locating marks.

Provision is also made for precise and fine adjustments of the carriage 91 after it is moved to approximate position by the fast traverse mechanism just described. This fine adjustment mechanism includes a rectangular block-like nut 106 (Figures 9 and 10) having a tapped bore from end to end through which is threaded an elongated tubular screw 107. This screw is suspended by tapered bearings 108 in apertured trunnions 109 which depend from the top plate 92 alongside the edges of the upper channel flange 83, and the screw has a square bore 110 (or other than round) to slidably receive a square, fine adjustment shaft 111. The bearing assemblies 108 are such as prevent endwise displacement of the screw 107 through the gimbals, and to permit any end play to be taken up, and since many such bearing assemblies are well known in the arts they are not detailed herein. The square shaft 111 at one end is mounted by a bearing 112 through the bearing bracket 100 before mentioned, and is provided with a knob 113 for turning it by hand. At the opposite end the shaft is supported in a bearing lug 114 (Figure 2) thus positioning the shaft parallel with the channel and guide 88. Turning the knob 113 will thus turn the screw 107 to adjust the carriage 91 relative to the nut 106, and to make such adjustment effective the nut is clamped or locked in place, after the carriage is positioned by the rapid traverse hand wheel 105.

For thus locking the nut 106, I provide clamp levers 115 at its four corners, pivoted to the nut on pins 116 and projecting into the guide channel to swing at their inner ends upwardly and downwardly, toward and away from the inside horizontal surfaces of the channel flanges 83 and 84. An elongated cam 117 is positioned between the upper and lower clamp levers upon a square locking shaft 118 carried by bearing brackets 119 secured to the opposite ends of the nut 106. The cam 117 thus may slide along the shaft 118 as the carriage 91 is traversed, but may be turned to cause its opposite eccentric cam faces 120 to engage and spread the clamp levers 115 and force them tightly against the flanges 83 and 84 as seen in Figure 9. The locking shaft 118 extends along the inside of the channel from end to end, being journaled out through the bearing bracket 100 at one end, where it is bent to form a crank 121 provided with a knob 122, and is carried at its opposite end in a bearing lug 123 on the inside of the channel web 82. Movement of the crank 121 in one direction will lock the nut 106 to the guide channel, and opposite movement will free it as will be readily appreciated.

The position of the carriage 91 is here again indicated, to an accuracy of one-thousandths of an inch, by a flexible tape 124 and cooperating scale 125 extending along the upper face of the flange 83 in a groove 126 provided for their reception. The graduations on the tape and scale, and their adjustment and mounting are the same as previously described for the main tape 44 and scale 45, the tape having numbered graduations in inches, with intervening numbered graduations in tenths, while the scale has graduations in tenths of inches and intervening shorter marks at intervals of twenty-five thousandths. The tape 124 runs over rollers 127 and 128 at opposite ends of the upper guide channel flange 83, and the roller at the outer end of the cross assembly carries a knob 129 for adjustment, and has locking cams operated by a lever 130 for securing the tape in place. A tightening spring for the tape is also provided, as seen at 131 in Figure 3. The scale 125 is dovetailed into the groove 126, and is adjusted endwise by a screw 132 and knob 133, exactly as previously described. For reading the tape and scale 124—125 a reading station is provided on the carriage 91, comprising a housing 134 secured to the top plate 92 over an opening 135 therein exposing the tape-scale, and having a sloping face 136 wherein is mounted an enlarging lens 137. Mirrors 138—139 (Figure 4) are mounted in the housing 134 to reinvert the image of the tape and scale and direct the image at such angle through the sloping lens 137 that it may be read with ease by an operator standing at the side of the table at which all of the traversing, locking and fine adjusting controls, 25, 30, 41, 105, 113 and 122 are located. It will be noted that these controls are all closely grouped and associated for convenient operation by a single operator. This reading station is also provided with illumination for reading ease, in the form of one or more small lamps, one of which appears at 140 in Figure 4.

The carriage 91 is provided with a sheet marking device which, in the embodiment here shown, comprises (Figure 9) an upright, single action hydraulic or fluid motor 141 having a cylinder 142 secured by bracket flanges 143 and cap screws 144 to the vertical face of the slide 89. A piston 145 in the cylinder 142 is secured to a depending, upwardly and downwardly movable plunger 146 extending through a suitable gland fitting 147 in the lower end of the cylinder. An expansion coil spring 148 in the cylinder urges the piston 145 and plunger 146 upward to a normal position at which the marking device clears the layout sheet B (Figure 3), but fluid may be forced into the upper end of the cylinder through a flexible fluid line 149 to urge the piston-plunger in a downward direction. The fluid line 149 is connected to the top of the cylinder by a fitting 150 and the line then is secured by a clamp 151 to the housing 134, and after forming a series of loops, is attached to the yoke arms 73—74 by a series of clamps 152. The line 149 runs around the yoke to the lower end of an actuating pump cylinder 153 secured by bracket flanges 154 to the yoke arm 73, and a plunger (not shown) in this cylinder may be forced down to drive fluid into the cylinder 142 by a hand lever 155. Said hand lever 155 is pivoted at 156 to a plunger rod 157, and extends out over the carriage 22 to a convenient position in the group of traversing, locking and fine adjusting controls previously referred to. As indicated at 158, a light electric cable is provided and extended parallel with the fluid line 149 to supply the station illuminating lamps 71—140. This cable 158 runs over a pulley 159 (Figure 1) on the end of the table A to a suitable take-up mechanism (not shown) to compensate for the travel of the carriage and yoke assembly, and the loops formed in the fluid line and cable between the carriage 91 and yoke arm 74 are, of course, to compensate for the travel of the former.

The marking device itself consists of a prick punch 160 (Figure 9) attached to the lower end of the plunger 146 and a surrounding annular marking member 161 centered about the punch and of such material that it may give a little as the punch strikes the sheet B. The member 147 is supplied in any suitable manner with an erasable marking ink, or like material, and will form a circle about each punch mark to facilitate the location thereof upon the comparatively large expanse of the sheet.

The respective carriage housings 66 and 91 carry verniers or vernior scales 66ª and 91ª which appear in Figures 5, 7, 8, and 9, and these verniers each depend from the housings to ride in sliding contact with the associated scales 45 and 125. The verniers 66ª and 91ª are conventionally graduated both ways from a zero point (Figure 7) through five main divisions and intervening shorter divisions, with the graduations for the entire span on the verniers one greater in number than the graduations on the same span on the scales, so that the graduation spaces on the latter may be subdivided and read to accuracies of one thousandth of an inch. It will be noted that the graduated portions of the scales 45 and 125 stand above the parts of the scales on which the verniers ride so that the graduated edges of these parts stand flush with each other.

In the use and operation of my machine, a layout sheet B is clamped on the table A as described, and a zero point, which may be located anywhere on the sheet, is chosen for an origin of the coordinates from which the layout points are to be located. The punch 161 is now located at this chosen zero point. The tapes and scales are next adjusted or indexed, bringing zero on the tapes to coincide with one of the tenth of an inch markings on the scales, the same process being carried out for both sets of tapes and scales 44—45 and 124—125. The machine is now set up for operation and as an example, by reference to Figure 2, it will be apparent that any points on coordinate axes paralleling the starting axes X—X and Y—Y may be accurately located and punch marks 162 and encircling locating marks 163 made to lay out the desired centers. In locating such points, measurements from the origin of coordinates may be taken from a prepared chart, and the main slide 21 adjusted first along the axis X—X by operating the rapid traverse hand wheel 25, locking the carriage 22 when the approximate location is reached by the locking crank 41, and finally moving the slide to the exact position by turning the fine adjustment knob 30, while observing the enlarged image of the vernier 66a, tape 44 and scale 45 through the lens 70. The location along the axis Y—Y is then similarly arrived at by fast traversing the carriage 91 by the hand wheel 105, locking the carriage with the crank 121, and finally reaching the exact position, as determined by observation of the image of the vernier 91a, tape 124 and scale 125 through the lens 137, by turning the fine adjustment knob 113. The hand lever 155 is then depressed, forcing fluid through the line 149 into the cylinder 142 so that the plunger 146 moves downward and brings the prick punch 160 and circle marker 161 into contact with the sheet. These operations are continued for each point to be marked, and due to the enlarged images of the verniers, scales and tapes afforded by the lenses 70—137, and the very accurate vernier readings thus made possible, the points may be located with an accuracy of the order of one-thousandth of an inch. The operation is further quite rapid and as compared to present-day layout methods is extremely fast, and represents a tremendous saving in man-hours, all as has been previously set out herein.

The actuating pump 153 for supplying fluid to the marker cylinder 142 may have any well known form of pressure limiting means to limit the force with which the punch 160 is driven against the sheet.

While the machine is here described as for locating prick punch layout marks, it will, of course, operate to scribe coordinate axes or grid lines if required, and for such operation the circle marker 161 will be removed, and then the carriage 91 may be moved in either direction by the traversing hand wheels 25—105 while maintaining a light pressure on the lever 155 to hold the punch against the layout sheet, all as will be readily understood by those skilled in the art.

It is sometimes necessary to return a layout sheet to the table for corrections or additions, and in order to reorient the machine to the chosen zero point, I provide, as shown in Figure 11, a magnifier 164 with a cross hair reticule 165 which may replace the marker cylinder 142 for this purpose. The operator may then re-zero the machine by locating the original zero or origin point in line with the reticule 165, being assisted by the optical magnification provided. It is, of course, important that the reticule 165 exactly line up with the axis on which the prick punch operates, and in practice I, no doubt, will provide a tapered, accurately machined clamp ring to selectively and accurately accommodate the cylinder 142 or magnifier 164.

While I have herein shown for example a combination of mechanical and fluid actuated means for operating the various parts of my machine, it will be understood that other methods of operation are possible and are considered within the scope of my invention, as defined in the claims. For example, small electric motors might be used for traversing, and solenoids for locking and marking. Also, since the machine is a self-contained unit, it lends itself well to use on the loft floor instead of a layout table, and may be readily adapted to such use. Layouts for scale models may be made, instead of full scale layouts, by changing the tapes and scales for others graduated in the desired proportion, and for such layout work as dies and patterns, scales may be readily substituted and graduated according to the well known shrinkage rules.

Thus while I have herein disclosed one possible and very useful modification of my invention, it is understood that I may vary therefrom so long as I do not depart from the spirit of my invention, as defined in the appended claims.

What I claim as new and desire to secure by Letters Patent is:

1. In a layout machine of the character described and for use on a layout sheet supporting surface, the combination comprising a main guide mounted on said surface along one edge of the layout sheet, a base block slidable lengthwise in said guide, a slide movable lengthwise with respect to the block, a yoke pivotally attached to the slide and extending laterally out over the layout sheet, a roller supporting the outer end of the yoke for travel over the sheet as the slide and block are adjusted along the main guide, a second guide carried by the yoke at right angles to the main guide, means for traversing the block and slide along the main guide, means for clamping the block to the main guide, means for then making fine adjustments of the slide in the block to accurately position the yoke and second guide in a first direction, a carriage on the second guide, means for traversing the carriage on its guide, means for finely and closely adjusting the carriage in a second direction at right angles to the first, and a marking device on the carriage for marking the layout sheet below.

2. In a layout machine of the character described and for use on a layout sheet supporting surface, the combination comprising a main guide mounted on said surface along one edge of the layout sheet, a base block slidable lengthwise in said guide, a slide movable lengthwise with respect to the block, a yoke pivotally attached to the slide and extending laterally out over the layout sheet, a roller supporting the outer end of the yoke for travel over the sheet as the slide and block are adjusted along the main guide, a second guide carried by the yoke at right angles to the main guide, means for traversing the block and slide along the main guide, means for clamping the block to the main guide, means for then making fine adjustments of the slide in the block to accurately position the yoke and second guide in a first direction, a carriage on the second guide, means for traversing the carriage on its guide and a nut and screw for finely adjusting the carriage in a second direction at right angles to the first direction, means for locking the nut to the second guide while making such fine adjustment, and prick punching means on the carriage.

3. In a layout machine of the character described and for use on a layout sheet supporting surface, the combination comprising a main guide mounted on said surface along one edge of the layout sheet, a base block slidable lengthwise in said guide, a slide movable lengthwise with respect to the block, a yoke pivotally attached to the slide and extending laterally out over the layout sheet, a roller supporting the outer end of the yoke for travel over the sheet as the slide and block are adjusted along the main guide, a second guide carried by the yoke at right angles to the main guide, means for traversing the block and slide along the main guide, means for clamping the block to the main guide, means for then making fine adjustments of the slide in the block to accurately position the yoke and second guide in a first direction, a carriage on the second guide, means for traversing the carriage on its guide, means for finely adjusting the carriage in a second direction at right angles to the first direction, a marking device on the carriage for marking the layout sheet below, cooperating scales and tapes extending along both of said guides, and verniers on the carriage and slide for indicating positions of the marking device in both of said directions.

4. In a layout machine of the character described and for use on a layout sheet supporting surface, the combination comprising a main guide mounted on said surface along one edge of the layout sheet, a base block slidable lengthwise in said guide, a slide movable lengthwise with respect to the block, a yoke pivotally attached to the slide and extending laterally out over the layout sheet, a roller supporting the outer end of the yoke for travel over the sheet as the slide and block are adjusted along the main guide, a second guide carried by the yoke at right angles to the main guide, means for traversing the block and slide along the main guide, means for clamping the block to the guide, means for then making fine adjustments of the slide in the block to accurately position the yoke and second guide in a first direction, a carriage on the second guide, means for traversing the carriage on its guide, means for finely adjusting the carriage in a second direction at right angles to the first direction, a marking device on the carriage for marking the layout sheet below, cooperating scales and tapes extending lengthwise along both of said guides, verniers on the carriage and slide for indicating the position of the marking device on coordinate axes, and the said scales and tapes being adjustable with respect to each other and with respect to the guides for indexing the marking device to a given starting reference point.

5. In a layout machine of the character described, the combination with carriages traversable at right angles, a marking device on one carriage, and guides supporting the carriages; of a tape graduated and marked in inches and tenths and movably mounted lengthwise on each of said guides for manual lengthwise adjustment, locking means for locking the tapes in adjusted positions, a graduated scale positioned on each guide alongside the associated tape, verniers on the carriages cooperating with the scales for vernier readings, and means supporting and actuating the scales for minor and precise lengthwise adjustments relative to the tapes.

TRUE ENGELHART.

REFERENCES CITED

The following references are of record in the file of this patent:

UNITED STATES PATENTS

| Number | Name | Date |
|---|---|---|
| 977,829 | Ourdan | Dec. 6, 1910 |
| 1,110,318 | Field et al. | Sept. 15, 1914 |
| 1,182,487 | Huebner | May 9, 1916 |
| 1,302,645 | Emery | May 6, 1919 |
| 1,370,645 | Hawkes | Mar. 8, 1921 |
| 1,408,098 | Knapp et al. | Feb. 28, 1922 |
| 1,424,941 | Pirwitz | Aug. 8, 1922 |
| 1,544,090 | Epnstein | June 30, 1925 |
| 1,665,842 | Brunings | Apr. 10, 1928 |
| 1,686,512 | Burkenstein | Oct. 9, 1928 |
| 1,694,490 | Salzmann | Dec. 11, 1928 |
| 1,927,992 | Pulver | Sept. 26, 1933 |
| 2,220,923 | Trilling | Nov. 12, 1940 |
| 2,252,535 | West et al. | Aug. 12, 1941 |
| 2,364,497 | Wahnish et al. | Dec. 5, 1944 |
| 2,390,520 | DeLorimier | Dec. 11, 1945 |
| 2,423,564 | Pierce | July 8, 1947 |
| 2,437,847 | Zeise | Mar. 16, 1948 |
| 2,455,972 | Bowdich | Dec. 14, 1948 |
| 2,481,246 | Schlatter | Sept. 6, 1949 |
| 2,503,392 | Kreipl | Apr. 11, 1950 |
| 2,549,634 | Parsons | Apr. 17, 1951 |

FOREIGN PATENTS

| Number | Country | Date |
|---|---|---|
| 460,914 | Germany | June 9, 1928 |
| 541,880 | Great Britain | Dec. 16, 1941 |
| 223,331 | Switzerland | Dec. 1, 1942 |